(12) United States Patent
Young

(10) Patent No.: US 8,378,584 B2
(45) Date of Patent: Feb. 19, 2013

(54) POWER FACTOR CONVERTER AND METHOD

(75) Inventor: James Roy Young, Tucson, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 471 days.

(21) Appl. No.: 12/639,580

(22) Filed: Dec. 16, 2009

(65) Prior Publication Data

US 2011/0140614 A1  Jun. 16, 2011

(51) Int. Cl.
 *H05B 37/02* (2006.01)
(52) U.S. Cl. .............................. 315/291; 363/15; 363/74
(58) Field of Classification Search .............. 315/185 R, 315/200 R, 209 R, 224, 225, 246, 247, 291, 315/307; 363/15, 21.01, 74, 78, 79
See application file for complete search history.

(56) References Cited

U.S. PATENT DOCUMENTS

| | | | | |
|---|---|---|---|---|
| 5,764,039 | A * | 6/1998 | Choi et al. ..................... | 323/222 |
| 8,004,262 | B2 * | 8/2011 | Saint-Pierre .................. | 323/284 |
| 8,120,283 | B2 * | 2/2012 | Tanaka et al. ................. | 315/307 |
| 2006/0279965 | A1 * | 12/2006 | Nakamura ..................... | 363/16 |
| 2009/0273290 | A1 * | 11/2009 | Ziegenfuss ................... | 315/193 |
| 2009/0315480 | A1 * | 12/2009 | Yan et al. ..................... | 315/297 |

OTHER PUBLICATIONS

ON Semiconductor, NCP1606 Application Note, "Cost Effective Power Factor Controller", Semiconductor Components Industries, LLC, Dec. 2008—Rev. 7.
ON Semiconductor, NCP1607 Application Note, "Cost Effective Power Factor Controller", Semiconductor Components Industries, LLC, Apr. 2009—Rev. 1.
ON Semiconductor, NCP1608 Application Note, "Critical Conduction Mode PFC Controller Utilizing a Transconductance Error Amplifier", Semiconductor Components Industries, LLC, Jun. 2009—Rev. 2.
ON Semiconductor, NCP1652 Application Note, "High-Efficiency Single Stage Power Factor Correction and Step-Down Controller", Semiconductor Components Industries, LLC, Jun. 2008—Rev. 0.

* cited by examiner

*Primary Examiner* — Jimmy Vu
(74) *Attorney, Agent, or Firm* — Rennie William Dover

(57) ABSTRACT

A method and circuit for controlling feedback in, for example, a power factor converter circuit. A current sense signal is compared with a reference signal to generate a comparison signal. A clipped signal is generated from the comparison signal where the signal is a periodic waveform that transitions between two levels that are symmetrically positioned about a reference signal. The clipped signal is used to generate a summed signal at the input of an integrator. The integrator generates a feedback signal suitable for use in, for example, a power factor converter circuit.

19 Claims, 1 Drawing Sheet

US 8,378,584 B2

POWER FACTOR CONVERTER AND METHOD

TECHNICAL FIELD

The present invention relates, in general, to power supplies and, more particularly, to feedback in power supplies.

BACKGROUND

Power converters are used in a variety of portable electronic devices including laptop computers, cellular phones, personal digital assistants, video games, video cameras, etc. In addition, they are used in non-portable applications such as, for example, Light Emitting Diode (LED) driver converters. They may convert a dc signal at one voltage level to a dc signal at a different voltage level (this is a dc-dc converter), an Alternating Current (ac) signal to a dc signal (this is an ac-dc converter), a dc signal to an ac signal (this is a dc-ac converter), or an ac signal to an ac signal (this is an ac-ac converter). Typically, these types of converters include a diode bridge rectifier stage and a bulk storage capacitor which produces a dc voltage from an ac signal provided by an ac line. This dc voltage is further processed by a converter which generates an output signal that is applied across a load. In this configuration, the rectifying circuit only draws power from the ac line when the instantaneous ac voltage is greater than the voltage across the bulk storage capacitor, resulting in a non-sinusoidal current signal that has high harmonic frequencies. A drawback with this configuration is that the power factor or ratio of real power to apparent power is usually very low. Thus, the converter draws excess current but fails to use the excess current to perform or accomplish any circuit functions.

To address the power factor issue, integrated circuit manufacturers couple a Power Factor Correction (PFC) stage to the diode bridge rectifier, which improves the use of current drawn from the main ac line by shaping it to be more sinusoidal. Generally, power converters that include PFC stages are either two-stage power converters, i.e., a two-stage PFC architecture, or single stage power converters, i.e., a single stage PFC architecture. A converter having a two-stage PFC architecture allows for optimization of each individual power stage. However, this type of architecture uses a large number of components and processes the power twice. A converter having a single stage PFC architecture uses fewer components, processes the power a fewer number of times which can improve efficiency, and can be more reliable than a two-stage architecture. A drawback with the single stage architecture is that it has a large output ripple which is at twice the ac line frequency. The magnitude of this ripple can overdrive conventional feedback networks forcing them outside of the linear response region or degrade their ability to maintain a high power factor. A technique for smoothing out or decreasing the ripple is to couple a filtering capacitor having a large capacitance value to the output filter network. Although the large capacitance smoothes out the ripple in the current delivered to the load without interfering with the control loop, it uses electrolytic capacitors which are large, expensive, and degrade circuit reliability. In addition, the large capacitance slows the response time of the control loop resulting in excessive current which can overdrive and potentially damage an LED load. The excessive currents typically occur when the converter is first energized or if the input voltage changes rapidly.

Another approach to mitigate high output ripple involves slowing the response time of the LED current feedback signal. The slower response introduces a delay in the feedback signal which is no longer representative of the actual current at a given moment in time. A slow control loop is used to minimize the effect of phase delay in the LED current feedback signal and maintains stable operating conditions. This slow response limits the circuit in responding to changing power line conditions potentially creating an excessive LED current. Initial power up also creates excessive current due to overshoot which can damage the LEDS. Systems with a slow feedback response are also prone to flicker which is undesirable in light sources.

Accordingly, it would be advantageous to have a method and a circuit that provides a feedback signal to a switching power controller that represents the average load current without ripple or time delays thereby allowing a rapid response to changing operating conditions. It would be of further advantage for the power converter and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a method and a circuit for improving or increasing the power factor. In accordance with an embodiment, the method is a feedback method that includes comparing a voltage signal with a reference signal to generate a comparison signal, where the voltage signal is representative of a current signal. The comparison signal is clamped or clipped to form a clipped signal which is used to generate a summed signal at a node. A control signal is generated from the summed signal, where the control signal is compared to a fixed ramp signal and provides a high power factor characteristic at the input of the power converter.

In accordance with another embodiment, a method for changing the power factor that includes using feedback and a single stage power factor modulation circuit is provided. A comparison signal is generated and a portion of the comparison signal is transmitted to a node. A power factor modulation control signal is generated from the portion of the comparison signal.

In accordance with another embodiment, a feedback circuit includes a current sense circuit coupled to a converter. A comparator circuit has an input terminal connected to the current sense circuit and an input terminal connected to the converter. A scaling circuit has an input terminal connected to an output terminal of the comparator and an output terminal connected to the input terminal of the converter. A compensation stage is connected to the input terminal of the scaling circuit.

Figure 1:
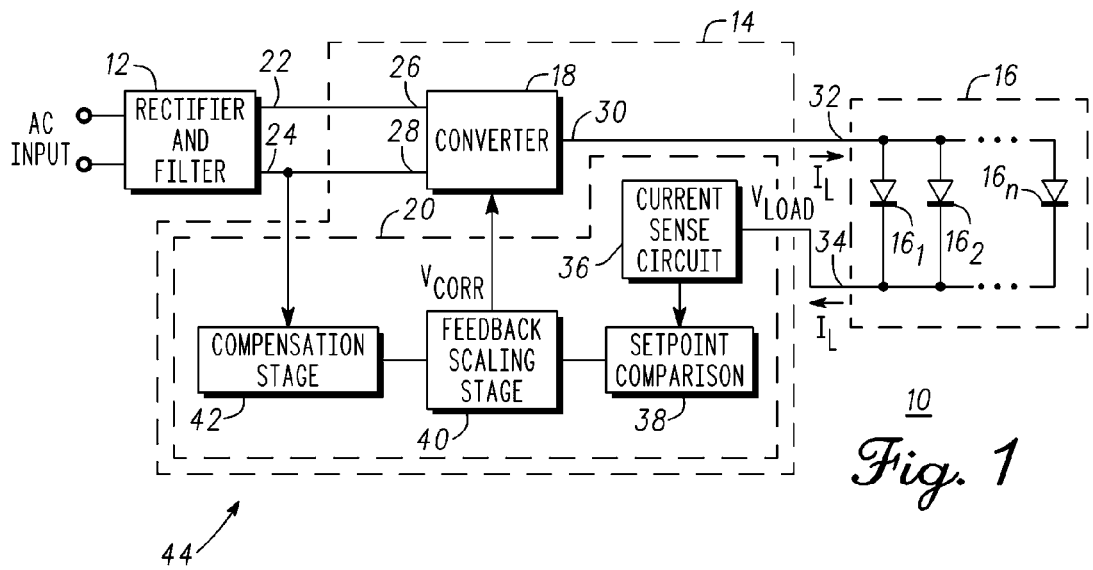
FIG. 1 is a circuit schematic of a converter and circuitry for controlling feedback in accordance with an embodiment of the present invention.

FIG. 1 is a block diagram of a power supply 10 in accordance with an embodiment of the present invention. Power supply 10 comprises an input stage 12 coupled to a load 16 through a single stage Power Factor Correction (PFC) converter circuit 14. By way of example, input stage 12 is a rectifier and filter circuit coupled for receiving an Alternating Current (AC) input signal. Single stage PFC converter circuit 14 comprises a converter 18 coupled to a digital feedback circuit 20. In accordance with an embodiment of the present invention, converter 18 is a switching power converter having inputs 26 and 28 connected to outputs 22 and 24 of input stage 12, respectively, and an output 30 connected to a terminal 32 of load 16. By way of example, load 16 is an array of Light Emitting Diodes (LEDS) $16_1$, $16_2$, ..., $16_n$ connected in parallel, where n is an integer. Alternatively, load 16 may be comprised of a plurality of LEDS configured in a series-parallel configuration, a series configuration, a series cross connect configuration, or the like. When load 16 is comprised of one or more LEDS it may be referred to as an LED load. Thus, load 16 may be comprised of one or more LEDS. Digital feedback circuit 20 includes a current sense circuit 36 connected in series with load 16 and to a comparison circuit 38. Thus, output 30 is coupled to an input of comparison circuit 38. Comparison circuit 38 is also referred to as a setpoint comparison circuit or a comparator.

Digital feedback circuit 20 further includes a feedback scaling stage 40 coupled between comparator 38 and switching power converter 18. Input stage 12 is coupled to feedback scaling stage 40 through a compensation circuit 42. Switching power converter 18, current sense circuit 36, setpoint comparator 38, feedback scaling stage 40 and compensation circuit 42 form a control loop 44. Switching power converter 18 includes a control stage coupled to an output stage through an inductor. Alternatively, switching power converter 18 may include a control stage coupled to an output stage through a transformer stage having primary and secondary coils which provide electrical isolation. Typically, the transformer stage has primary and secondary sides configured as a single stage converter. Circuit architectures for switching power converter 18 are known to those skilled in the art. For example, switching power converter 18 can be a flyback converter using a fixed on-time control as found in part number NCL30000 and sold by ON Semiconductor, LLC.

Figure 2:
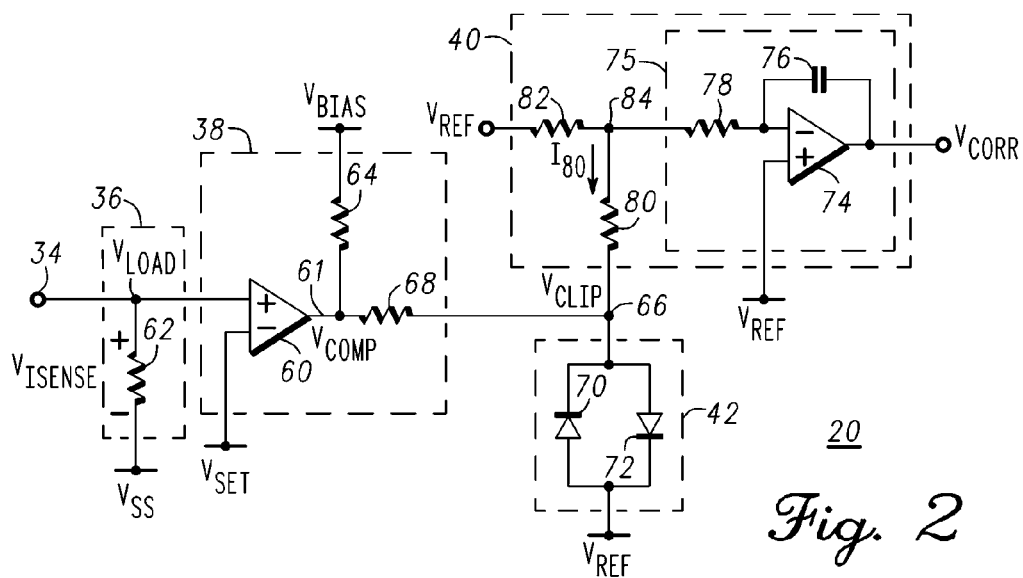
FIG. 2 is a circuit schematic of a portion of the circuitry for controlling feedback that is suitable for use with the converter of FIG. 1.

FIG. 2 is a schematic diagram of digital feedback circuit 20 in accordance with an embodiment of the present invention. What is shown in FIG. 2 is a comparator 60 having an inverting input terminal, a non-inverting input terminal, and an output terminal 61. The inverting input terminal is coupled for receiving a reference voltage or signal $V_{SET}$ and the non-inverting input terminal is coupled to a terminal of a current sense resistor 62. Reference voltage $V_{SET}$ is also referred to as setpoint voltage $V_{SET}$. The other terminal of current sense resistor 62 is coupled for receiving a source of operating potential such as, for example, $V_{SS}$. By way of example, source of operating potential $V_{SS}$ is ground. In addition, the non-inverting input terminal is connected to terminal 34 of load 16 (shown in FIG. 1). Output terminal 61 of comparator 60 is coupled for receiving a bias voltage $V_{BIAS}$ through a resistor 64 and to a node 66 through a resistor 68. A reference voltage $V_{REF}$ is coupled to node 66 through a pair of diodes 70 and 72 that are coupled in an anti-parallel configuration, i.e., the cathode of diode 70 and the anode of diode 72 are connected together and to node 66 and the anode of diode 70 and the cathode of diode 72 are connected together and for receiving reference voltage $V_{REF}$.

Digital feedback circuit 20 further includes an operational amplifier 74 having an inverting input terminal, a non-inverting input terminal, and an output terminal. Operational amplifier 74 is also referred to as an error amplifier. Error amplifier 74 in combination with a capacitor 76 and a resistor 78 form an integrator 75, where capacitor 76 is coupled between the output terminal and the inverting input terminal of error amplifier 74, and the non-inverting input terminal of error amplifier 74 is coupled for receiving reference voltage $V_{REF}$. A terminal of a resistor 78 is connected to the inverting input terminal of error amplifier 74 and the other terminal of resistor 78 is connected to terminals of resistors 80 and 82 to form a node 84. In addition, resistors 80 and 82 have terminals that are connected to node 66 and coupled for receiving reference voltage $V_{REF}$, respectively. Although compensation circuit 42 and the noninverting input terminal of error amplifier 74 are coupled for receiving a reference voltage $V_{REF}$, it should be noted that they may be coupled for receiving reference voltages having different voltage values. In accordance with one example, the resistance value of resistor 80 is about 47,000 Ohms and current $I_{80}$ is about 10 microamperes. In accordance with this exemplary embodiment, setpoint comparison circuit 38 comprises comparator 60 and resistors 64 and 68, current sense circuit 36 comprises resistor 62, compensation circuit 42 comprises diodes 70 and 72, and feedback scaling stage 40 comprises error amplifier 74, capacitor 76, and resistors 78, 80, and 82. Setpoint comparison circuit 38, current sense circuit 36, compensation circuit 42, and feedback scaling stage 40 are shown in FIG. 1.

In operation, an ac input line voltage is applied at the ac inputs of input stage 12 which causes a current $I_L$ to flow from output terminal 30 into load terminal 32. By way of example, current $I_L$ is the current through diode array $16_1$, $16_2$, ..., $16_n$. When load current $I_L$ flows through an LED load, it may be referred to as an LED load current $I_L$. Current $I_L$ flows through current sense resistor 62 generating a current sense signal $V_{ISENSE}$ that is representative of the current through load 16 and that is comprised of an average component and a ripple component having a frequency that is twice the ac line frequency. Comparator 60 compares current sense signal $V_{ISENSE}$ with setpoint voltage $V_{SET}$ and generates a comparison signal $V_{COMP}$ at output terminal 61. Comparison signal $V_{COMP}$ is a logic high voltage if current sense signal $V_{ISENSE}$ is greater than setpoint voltage $V_{SET}$ and a logic low voltage if current sense signal $V_{ISENSE}$ is less than setpoint voltage $V_{SET}$. Thus, a digital representation of the current state is generated at the output terminal of comparator 60 based on the instantaneous LED current $I_L$ being above or below the desired average current. It should be noted that setpoint voltage $V_{SET}$ is a reference signal that is scaled to a desired average LED current level.

At node 66, circuit 42 clips or clamps digital comparison signal $V_{COMP}$ to form a clipped or controlled amplitude signal $V_{CLIP}$. Clipped signal $V_{CLIP}$ appearing at node 66 has a value either substantially one diode drop above or substantially one diode drop below reference voltage $V_{REF}$. Thus, clipped signal $V_{CLIP}$ has controlled symmetrical levels above or below reference voltage $V_{REF}$ that correlate with the instantaneous state of the LED current $I_L$ relative to a desired average LED current. It should be noted that the types of diode for diodes 70 and 72 are not limitations of the present invention. Diodes 70 and 72 can be PN diodes, Schottky diodes, Zener diodes, transistors connected as diodes, etc. Alternatively, the correction signal introduced by resistor 80 can be realized using current sources.

Figure 3:
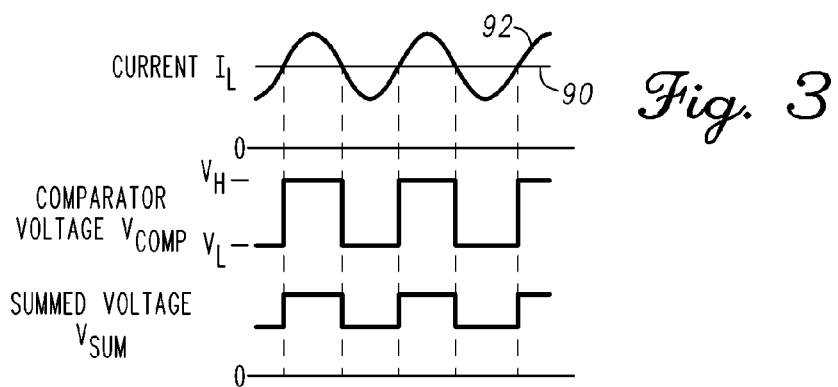
FIG. 3 is a timing diagram that may be associated with the circuits of FIGS. 1 and 2.

FIG. 3 is a timing diagram of the LED current signal $I_L$, voltage $V_{COMP}$ appearing at node 61, and voltage $V_{SUM}$ appearing at node 84. More particularly, FIG. 3 illustrates that load current $I_L$ is comprised of an average component 90 and a ripple component 92. Comparator voltage $V_{COMP}$ is a periodic signal having an amplitude that ranges from a voltage level $V_H$ to a voltage level $V_L$, in accordance with LED current signal $I_L$. In addition, FIG. 3 illustrates voltage $V_{SUM}$, which oscillates about reference voltage $V_{REF}$.

Load current $I_L$ flows through load 16, through terminal 34 (shown in FIGS. 1 and 2), and through resistor 62 (shown in FIG. 2) thereby generating a current sense voltage $V_{ISENSE}$ across resistor 62. The flow of load current $I_L$ through resistor 62 may be referred to as injecting a current into resistor 62. A voltage $V_{LOAD}$ appears at terminal 34, where voltage $V_{LOAD}$ is the sum of voltage $V_{ISENSE}$ and operating potential $V_{SS}$. As those skilled in the art are aware, when operating potential $V_{SS}$ is a ground potential, voltage $V_{LOAD}$ equals voltage $V_{ISENSE}$. It should be noted that voltage $V_{LOAD}$ is either greater than or less than setpoint voltage $V_{SET}$. When switching power converter 18 delivers the desired energy to load 16, load current $I_L$ dwells above or below setpoint voltage $V_{SET}$ equally at twice the ac line frequency such that the average current generates a voltage $V_{LOAD}$ that is equal to setpoint voltage $V_{SET}$. Comparator 60 generates a comparison voltage $V_{COMP}$ at terminal 61. Compensation circuit 42 uses comparison voltage $V_{COMP}$ to generate a signal $V_{CLIP}$ at node 66. Under this condition, voltage $V_{CLIP}$ does not influence the voltage at node 84. Thus, the average voltage at node 84 is substantially equal to the voltage $V_{REF}$ coupled to resistor 82. Error amplifier 74 generates an error or correction signal $V_{CORR}$ based on the difference between reference voltage $V_{REF}$ which appears at its non-inverting input terminal and the voltage which appears at its inverting input terminal. Because, the average voltage at node 84 is substantially equal to the voltage $V_{REF}$ coupled to resistor 82, the voltages appearing at the inverting and non-inverting input terminals of operational amplifier 74 are substantially equal. Operational amplifier 74 integrates the voltage at node 84 thereby generating a correction or control signal $V_{CORR}$ at its output terminal for adjusting switching power converter 18 so that it delivers the desired energy to load 16, e.g., LED array $16_1$, $16_2$, ..., $16_n$.

Under conditions in which voltage $V_{CLIP}$ influences the voltage at the inverting input terminal of operational amplifier 74, the voltage appearing at node 84 is comprised of a combination of the voltage $V_{REF}$ that is coupled to resistor 82 and the symmetrical signal $V_{CLIP}$ generated at node 66 by comparator 60 and diodes 70 and 72 as modified by resistor 80. The voltage appearing at node 84 is referred to as a summed signal. In this case, resistor 80 in combination with the voltage at node 66 generates a small controlled current $I_{80}$ having an amplitude that is established by clipping diodes 70 and 72. The current can be controlled by the value of resistor 80 and is either added to or subtracted from node 84 depending on whether the instantaneous current flowing through load 16 is respectively above or below the setpoint average current. Current $I_{80}$ is substantially equal to the voltage across diodes 70 and 72 divided by the resistance value of resistor 80. Thus, clipped signal $V_{CLIP}$ at node 66 reflects the state of the instantaneous load current $I_L$ and will be either greater than or less than the value of reference voltage $V_{REF}$. Because clipped signal $V_{CLIP}$ reflects the state of the instantaneous load current $I_L$, the current that is added to, i.e., injected into, or subtracted from node 84 is in response to the comparison signal $V_{COMP}$.

Current $I_{80}$ follows the ripple in load 16 which has a frequency that is twice that of the input frequency. Thus, current $I_{80}$ is transmitted through resistor 80 and generates a current sense signal that modifies the signal at the inverting input terminal of error amplifier 74, which results in integrator 75 integrating the summed signal to generate an output signal $V_{CORR}$ that serves as a linear control signal for switching power converter 18. It should be noted that current $I_{80}$ may be referred to as a correction current. Resistor 80 adds or subtracts a controlled signal from node 84 which is integrated by integrator 75 to provide correction signal $V_{CORR}$. If the average load current $I_L$ is below the desired setpoint, node 66 will dwell longer in the low state establishing a lower voltage at node 84, which increases correction signal $V_{CORR}$ resulting in an increased amount of energy delivered by switching power converter 18. If the average load current $I_L$ is greater than the desired setpoint, node 66 will dwell longer in the high state establishing a high voltage at node 84, which decreases correction signal $V_{CORR}$ resulting in a decreased amount of energy delivered by switching power converter 18.

It should be noted that the signal from resistor 80 is independent of the magnitude of the difference between the actual LED current $I_L$ and the setpoint current. This is in contrast to conventional feedback methods where the correction signal is proportional to the error magnitude. An advantage of embodiments in accordance with the present invention is that the correction signal is limited which precludes an overdrive condition found in conventional feedback systems operating in the presence of high ripple or error content.

The time constant of integrator 75 is selected to be sufficiently slow so that error amplifier 74 does not respond instantaneously to injected current $I_{80}$, but rather makes minor corrections over several cycles to adjust for changing conditions. In this way the control loop maintains a high input power factor by not altering the duty cycle over the period of the line frequency. When the average LED current is at the desired level, the instantaneous power will dwell for an equal amount of time above and below the average setpoint. The symmetrical current signal $I_{80}$ is in the high and low states for an equal amount of time. Integrator 75 creates a zero average condition that maintains a fixed voltage at the output terminal of error amplifier 74 and therefore a constant pulse width in the switching converter. Current $I_L$ through load 16 remains at the setpoint level and thus the input power factor will be high.

If load current $I_L$ falls below the desired average setpoint, the voltage presented to integrator 75 becomes slightly lower. In response, error amplifier 74 raises its output signal which causes the switching converter to increase the current delivered to load 16. If load current $I_L$ and therefore current $I_{80}$, rises above the average setpoint, error amplifier 74 reduces its output voltage which causes power switching converter 18 to decrease the current delivered to load 16. Thus the signal at the output of error amplifier 74 changes the current delivered to load 16 and maintains regulation at the setpoint.

When sufficient adjustment is made and the average LED current reaches the setpoint level, the amount of time that comparator signal $V_{COMP}$ spends at a logic high level substantially equals the amount of time it spends at a logic low level and integrator 75 reaches equilibrium, signaling converter 18 to maintain its present setting. Because comparator signal $V_{COMP}$ represents load current $I_L$ and it has substantially zero delay, control loop 44 quickly responds to changes in load current $I_L$. It should be noted that the amplitude of correction current $I_{80}$ is independent of the deviation of load current $I_L$ from the setpoint level. Because the controlled amplitude correction is independent of the magnitude of the error signal in accordance with embodiments of the present invention, over-driving the feedback loop and overcorrecting load current $I_L$ is avoided. The response time of embodiments in accordance with the present invention, is controlled by the time constant of integrator 75.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for generating a feedback signal, comprising:
    comparing a current sense signal with a first reference signal to generate a comparison signal that is at a first logic voltage level in response to the current sense signal being greater than the first reference signal or at a second logic voltage level in response to the current sense signal being less than the first reference signal;
    injecting a first current into a first node in response to the comparison signal having a first value;
    directing the first current away from the first node in response to the comparison signal having a second value; and
    integrating an electrical signal at the first node to generate the feedback signal at a second node.

2. The method of claim 1, wherein injecting the first current into the first node includes injecting the first current into the first node in response to the current sense signal being greater than the first reference signal.

3. The method of claim 2, wherein comparing the current sense signal with the first reference signal includes injecting a second current into a resistor to generate the current sense signal.

4. The method of claim 3, wherein the second current injected into the resistor is current flowing through a light emitting diode.

5. The method of claim 1, wherein directing the first current away from the first node includes directing the first current from the first node in response to the current sense signal being less than the first reference signal.

6. The method of claim 5, wherein comparing the current sense signal with the first reference signal includes injecting a second current into a resistor to generate the current sense signal.

7. The method of claim 1, wherein integrating the signal at the first node includes integrating a voltage signal at the first node.

8. The method of claim 1, wherein integrating the signal at the first node includes using an integrator having a time constant that generates the feedback signal over a plurality of cycles.

9. The method of claim 1, further including using the feedback signal at the second node to change a second current flowing through a load.

10. The method of claim 9, wherein the load comprises an array of light emitting diodes.

11. The method of claim 10, wherein the array of light emitting diodes is configured in a configuration selected from the group of configurations comprising a series parallel configuration, a series configuration, and a series cross connect configuration.

12. A method for generating a correction signal using a single stage power factor modulation circuit, comprising:
    generating a digital comparison signal;
    using the digital comparison signal to one of add a current to a first node or subtract a current from the first node, wherein using the digital comparison signal to one of add the current to the first node or subtract the current from the first node comprises:
        adding the current to the first node in response to the digital comparison signal being in a first state; and
        subtracting the current from the first node in response to the digital comparison signal being in a second state; and
    integrating an electrical signal at the first node to generate the correction signal.

13. The method of claim 12, wherein generating the digital comparison signal comprises comparing first and second voltage signals.

14. The method of claim 13, wherein generating the digital comparison signal includes using a light emitting diode load current to generate the first voltage signal.

15. The method of claim 12, further including using a load current to generate a voltage signal, wherein the digital comparison signal is in the first state in response to the voltage signal being greater than a reference signal and the comparison signal is in the second state in response to the voltage signal being less than the reference signal.

16. The method of claim 12, wherein integrating the signal at the first node includes generating a control signal that changes an output current of a converter.

17. A feedback circuit, comprising:
    a converter having a feedback terminal and an output terminal;
    a current sense circuit having first and second terminals, the first terminal coupled to the output terminal of the converter;
    a comparator circuit having an input terminal and an output terminal, the input terminal coupled to the output terminal of the current sense circuit;
    a scaling circuit having first and second input terminals and an output terminal, the first input terminal coupled to the output terminal of the comparator circuit and the output terminal coupled to the feedback terminal of the converter; and
    a compensation stage having an output terminal coupled to the second input terminal of the scaling circuit.

18. The feedback circuit of claim 17, wherein:
    the current sense circuit comprises a resistor having the first and second terminals;
    the scaling circuit comprises:
        an operational amplifier having an inverting input terminal, a noninverting input terminal, and an output terminal; and
        a capacitor coupled between the inverting input terminal and the output terminal of the operational amplifier;
    and wherein the compensation stage comprises:
    a first diode having an anode and a cathode; and
    a second diode having an anode and a cathode, the anode of the first diode coupled to the cathode of the second diode and the anode of the second diode coupled to the anode of the first diode.

19. The feedback circuit of claim 18, wherein the scaling circuit further comprises:
    a first resistor having first and second terminals, the first terminal coupled to the inverting input terminal of the operational amplifier;
    a second resistor having first and second terminals, the first terminal coupled to the second terminal of the first resistor; and
    a third resistor having first and second terminals, the first terminal coupled to the first terminal of the second resistor.

* * * * *